United States Patent [19]
Payne

[11] Patent Number: 5,062,740
[45] Date of Patent: * Nov. 5, 1991

[54] LAMINATE FORMING AND APPLYING APPARATUS AND METHOD AND PRODUCT THEREFROM

[76] Inventor: Le Roy Payne, 3300 Nicholas La., Molt, Mont. 59057

[*] Notice: The portion of the term of this patent subsequent to Sep. 11, 2007 has been disclaimed.

[21] Appl. No.: 572,397

[22] Filed: Aug. 27, 1990

Related U.S. Application Data

[60] Division of Ser. No. 417,501, Oct. 5, 1989, Pat. No. 4,955,760, which is a continuation-in-part of Ser. No. 235,205, Aug. 23, 1988, Pat. No. 4,872,784.

[51] Int. Cl.$^5$ .................. E01C 19/00; E02B 11/02
[52] U.S. Cl. .................. 405/270; 156/547; 156/550; 405/258; 405/268
[58] Field of Search ............ 405/270, 38, 258, 52, 405/128, 129, 268; 156/547, 550, 552, 577–579

[56] References Cited

U.S. PATENT DOCUMENTS

| | | | |
|---|---|---|---|
| 3,542,621 | 11/1970 | Calhoun et al. | 156/547 X |
| 3,576,696 | 4/1971 | Normanton | 156/547 |
| 4,035,543 | 7/1977 | Draper et al. | 405/270 |
| 4,050,972 | 9/1977 | Cardinal | 405/270 X |
| 4,417,939 | 11/1983 | McAdams | 156/547 X |
| 4,828,432 | 5/1989 | Ives | 405/270 |

*Primary Examiner*—Dennis L. Taylor
*Attorney, Agent, or Firm*—Arthur L. Urban

[57] ABSTRACT

A continuous structural laminate includes a plurality of continuous generally parallel spaced integrally bonded porous blankets with a continuous polymeric matrix extending through each porous blanket. The polymeric matrices include solidified polymeric mixtures with each mixture including a polymer forming material, a gas foaming agent, a catalyst and a major portion of a particulate reinforcement. The polymeric matrices include compatible polymer forming materials. At least two of the blankets include polymeric matrices with differing particulate reinforcements. The continuous structural laminate is formed and applied with mobile apparatus including a support portion, a raw material supplying portion, a mixing portion, a matrix forming portion and a control portion. The support portion includes at least two base sections with carriages depending from a first base section including a plurality of spaced transverse axle assemblies and wheels mounted on free ends of each axle assembly. A boom section extends from the first base section with transfer mechanism selectively moving a second base section along the boom section. The raw material supplying portion includes a plurality of reservoirs disposed on the first base section. A blanket support also is disposed on the first base section. The mixing portion, matrix forming portion and blanket combining mechanism are disposed closely adjacent to the second base section and movable therewith.

19 Claims, 1 Drawing Sheet

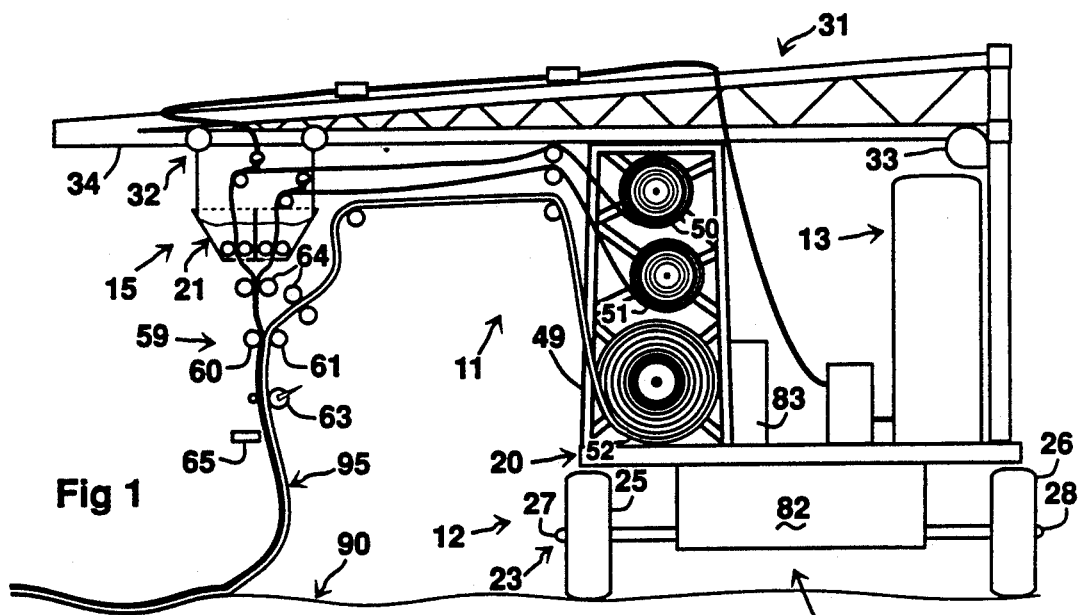
Fig 1
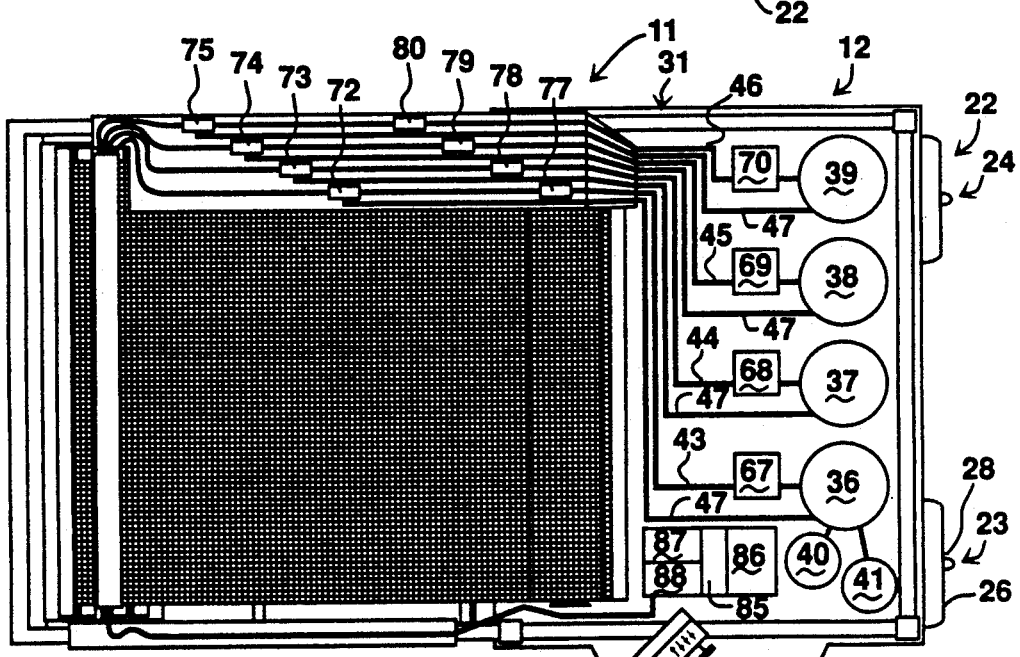
Fig 2
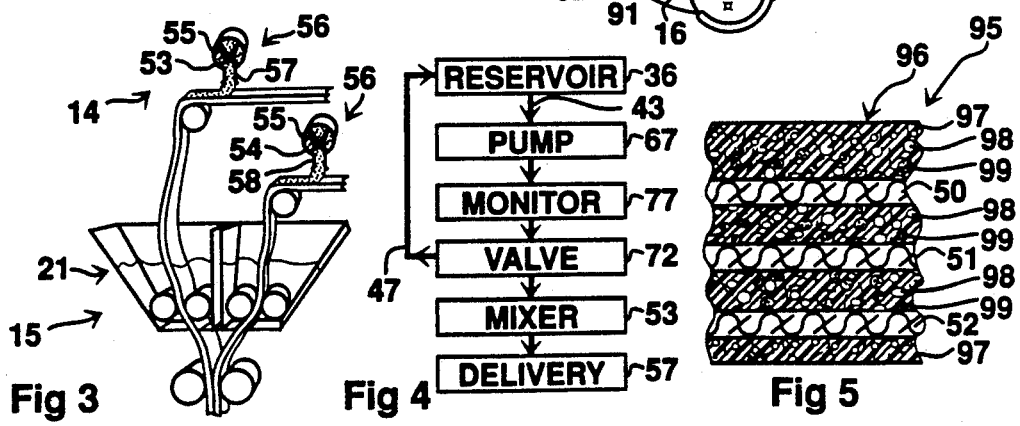
Fig 3
Fig 4
| RESERVOIR | 36 |
| --- | --- |
| PUMP | 67 |
| MONITOR | 77 |
| VALVE | 72 |
| MIXER | 53 |
| DELIVERY | 57 |
Fig 5

LAMINATE FORMING AND APPLYING APPARATUS AND METHOD AND PRODUCT THEREFROM

This application is a divisional of application Ser. No. 07/417,501, filed Oct. 5, 1989, now U.S. Pat. No. 4,955,760, which is a continuation-in-part of application Ser. No. 07/235,205, filed Aug. 23, 1988, now U.S. Pat. No. 4,872,784.

The invention relates to a novel mobile laminate forming and applying apparatus and method and to a new continuous structural laminate produced therefrom.

In primitive societies, travel from one location to another was along the most accessible route through the natural terrain. Continuing traffic along the same route produced a permanent path that served both human beings and their animals. However, as civilizations developed and vehicles attempted to use such narrow pathways, it was necessary to remove obstacles along the edges to provide a wider path that could accommodate the vehicles. Further travel by vehicles compacted the base and created a rough roadway.

Later as motorized vehicles became more common, traffic on these primitive roads increased to an extent that it became necessary to provide areas of greater width periodically to accommodate the passing of vehicles. Along with the increased traffic, another problem was the capability of motor vehicles to operate at ever increasing speeds. To handle such traffic safely, it was necessary to upgrade road systems by building multilane roads and by paving the roads to provide a smoother surface.

Although highway designs and construction methods have become more sophisticated through the years, there have been no major advances since the building of the coast-to-coast freeway systems. Also, improvements in the durability of our roads have not kept pace with highway designs. As a result, a great deal of highway maintenance is required every year.

While we are more aware of highway maintenance due to the detours and other delays we encounter as we travel and the increases in our taxes for this maintenance, many other surfaces that we encounter regularly perform just as poorly. For example, athletic fields covered with artificial turf instead of grass are reported to increase the frequency and severity of player injuries. Many football players say that falling on artificial turf is like falling on concrete.

In other athletic activities such as high jumping and pole vaulting, it now is common to use monstrous inflated bags in the landing area. Such bags are required because natural field surfaces do not provide sufficient cushioning to prevent injuries.

From the above discussion, it is apparent that surfaces being used currently and in the past do not meet fully our present and future requirements. Thus, there is a need for new surfaces that fulfill our desired characteristics.

The present invention provides a novel mobile laminate forming and applying apparatus, method and product which overcome the deficiencies of previous expedients. The invention not only overcomes the shortcomings, but also provides features and advantages not found in previous technology. The mobile laminate forming and applying apparatus and method of the invention produce a uniform high quality structural laminate continuously and quickly with a minimum of base preparation. The laminate is formed and placed with little hand labor. With the apparatus and method of the invention, the structure and composition of the laminate can be changed along its length as desired automatically to provide special surface performance characteristics such as greater durability, cushioning, load bearing, water removal, gripping and the like.

The mobile laminate forming and applying apparatus of the present invention is simple in design and can be produced relatively inexpensively. Commercially available materials and components can be utilized in the manufacture of the apparatus. Conventional metal working fabricating procedures can be employed by semi-skilled labor in the manufacture of the apparatus.

Also, semi-skilled workmen can operate the apparatus of the invention efficiently after a minimum of instruction. The apparatus is durable in construction and has a long useful life with little maintenance.

The apparatus and method of the invention can be modified to form a variety of different laminates. Variations in physical dimensions, composition, surface appearance and other performance characteristics can be achieved quickly. Even with such variations, uniform quality of configuration and composition are maintained without difficulty.

These and other benefits and advantages of the novel mobile laminate forming and applying apparatus, method and product of the present invention will be apparent from the following description and the accompanying drawings in which:

FIG. 1 is a side view of one form of mobile continuous structural laminate forming and applying apparatus of the invention;

FIG. 2 is a top view partially in section of the laminate forming and applying apparatus shown in FIG. 1;

FIG. 3 is an enlarged fragmentary side view in section of the mixing and matrix forming portions of the laminate forming and applying apparatus shown in FIGS. 1 and 2;

FIG. 4 is a schematic illustration of one form of control portion of the laminate forming and applying apparatus of the invention; and FIG. 5 is an enlarged fragmentary cross-sectional view of one form of structural laminate of the invention.

As shown in the drawings, one form of mobile continuous structural laminate forming and applying apparatus 11 of the present invention includes a support portion 12, a raw material supplying portion 13, a mixing portion 14, a matrix forming portion 15 and a control portion 16.

The support portion 12 of the mobile laminate forming and applying apparatus 11 of the invention includes at least two base sections 20 and 21. Carriage means 22 depending from base section 20 includes a plurality of spaced transverse axle assemblies 23 and 24 with wheels 25 and 26 mounted on free ends 27 and 28 of each axle assembly.

A boom section 31 extends from the first base section 20, advantageously substantially perpendicular to the axle assemblies 23 and 24. Transfer means 32 is associated with boom section 31 and disposed therealong. The transfer means 32 preferably includes drive means 33 and track means 34 which selectively moves second base section 21 along the boom section.

The raw material supplying portion 13 of the laminate forming and applying apparatus 11 includes a plurality of reservoirs 36, 37, 38, 39, 40 and 41 as required.

These reservoirs may include resin forming materials, fillers, reinforcements, colors, catalysts, foam forming materials, other additives, inert mixtures thereof and the like. Reservoirs 40 and 41 are connected with reservoir 36 for premixing of inert materials therein prior to transfer to the mixing portion 14.

Reservoirs 36–39 of the raw material supplying portion 13 are independently connected to the mixing portion 14 through conduit means 43, 44, 45 and 46. Advantageously, separate bypass return conduit means 47 extend from one end of each conduit 43–46 adjacent the mixing portion 14 back to the respective reservoir 36–39 as illustrated in FIGS. 2 and 4.

Blanket support means 49 also is disposed on the first base section 20. Advantageously, the blanket support means accommodates a significant length of one or more continuous porous blankets shown as rolls 50, 51 and 52 in a dispensing orientation. Suitable porous blankets include woven, knit, non-woven structures and the like. The blankets, e.g. fabrics, mats, etc. may be formed of continuous or discontinuous fibers, yarns, slit ribbons and the like. If desired, reinforcing members such as ropes, cables, scrims, etc. that extend longitudinally and/or transversely of the blanket centerline may be included therein.

The mixing portion 14 of the laminate forming and applying apparatus 11 of the invention includes mixing chambers 53 and 54. The chambers are disposed adjacent the second base section 21 and movable therewith. A plurality of deflector sections 55 are disposed within the mixing chamber spaced along the length of the chamber. The deflector sections advantageously are movable with respect to the chamber.

The matrix forming portion 15 of the apparatus 11 includes polymeric mixture delivery means 56. The delivery means is disposed closely adjacent to and movable with the mixing portion 14 and the second base section 21.

The mixture delivery means 56 advantageously includes an elongated chamber 57 that is disposed substantially parallel to the blanket support means 49, that is, substantially perpendicular to the line of movement of the blankets through the matrix forming portion.

The matrix forming portion 15 also includes blanket combining means 59. The blanket combining means advantageously includes a compression roller 60. Preferably, the combining means includes at least one pair of cooperating aligned rollers 60 and 61.

The matrix forming portion advantageously includes laminate cutting means 63, laminate end grasping means 64 and cut monitoring means 65 to detect the cut and activate the end grasping means. The matrix forming portion 15 and the mixing portion 14 preferably are disposed on the second base section 21.

The control portion 16 of the laminate forming and applying apparatus 11 of the present invention includes a plurality of pumps, valves, sensors, monitors and the like. Advantageously, a pump 67, 68, 69 or 70; a valve 72, 73, 74 or 75; and a flow monitor 77, 78, 79 or 80 are located along the length of each conduit 43–46 respectively that extends between the raw material reservoirs 36–39 and the mixing chambers 53, 54.

The control portion 16 also includes a plurality of drive means. A first drive 82 advantageously advances the laminate forming and applying apparatus along a preselected path for the application of the structural laminate of the invention thereto. Preferably, a second drive means 83 advances the continuous porous blankets through the matrix forming portion 15. As disclosed above, a third drive 33 preferably moves the second base section along track 34.

The pumps, valves, drives and other components are controlled by actuating means 85 that is responsive to information from the flow monitors and other sensors. The actuating means also is responsive to instructions from programmable memory means 86. The pumps, valves, drives etc. of the control portion preferably include electrical motors.

Advantageously, the control portion includes coordinating means 87, preferably including a process controller 88. The process controller initiates changes in the flows of materials and speeds of drives to bring variations therein back to the rates specified in the program present in the memory means 86.

This coordination commonly is achieved through the transmission of information such as digital pulses from the monitors and/or sensors at the control components to the process controller 88. The operating information is compared with the preselected programming parameters stored in the memory. If differences are detected, instructions from the controller change the operation of the components to restore the forming operation to the preselected process specifications.

Novel continuous structural laminates of the present invention may be formed using the mobile apparatus 11 shown in FIGS. 1–3 employing the following steps of the method of the invention. The design of the structural laminate is established by reference to the condition of the base surface and the intended use of the laminated surface as well as other pertinent factors. The process parameters for the particular laminate being formed are programmed into the control portion 16 including memory 86 which may be a computer.

A minimum of base preparation is required. With a new surface, forming the base surface in the desired configuration usually is all that is necessary. With base surfaces that previously have been used, surface preparation may require restoration to the original configuration or another that is desired. In any case, the base preparation is much less than for placing concrete mixes, plastic films, preformed coverings, etc. When the base is ready, buttons 91 on panel 92 are depressed to move apparatus 11 into position with second base section 21 thereof over the part of the surface 90 being covered initially.

The depression of the buttons and/or switches also has activated memory means 86, actuating means 85 coordinating means 87 and the other components of the control portion. The pumps 67–70, valves 72–75 and flow monitors 77–80 are energized in the preselected sequences of the memory. This causes the raw materials stored in reservoirs 36–39 to advance along the respective conduits 43–46 toward the mixing chambers 53 and 54. For example, to produce a foamed polyurethane resin matrix, reservoir 36 may contain an isocyanate, 37 a polyol, 38 a gas foaming agent and 39 a catalyst. The other reservoirs contain fillers, reinforcements, colors, etc. which are added in various proportions, sizes and types.

The delivery of raw materials to the mixing chambers 53 and 54 will vary depending upon the particular formulation and quantity thereof required for a specific incremental area of the laminate being formed at that moment. Although the flows through the conduits into the mixing chambers will vary, it is important that the raw materials entering the mixing chambers maintain a uniform quality. This can be accomplished by including for each conduit 43–46 a bypass 47 that extends from the end of the conduit adjacent the mixing chambers back to the respective reservoir.

The control portion 16 coordinates the operation of the various system components so the required polymeric formulation flows from a first mixture delivery chamber 57 into a first blanket 50 passing thereunder. Simultaneously, a second blanket 51 moves under a second mixture delivery chamber 58 from which a second polymeric formulation flows into the blanket passing thereunder. In the same way, other formulations may be applied to additional blankets (not shown). Thereafter, the blankets are combined as shown in FIGS. 1 and 3.

The combined blankets then pass between pressure rollers 59 which compress the impregnated blankets together and at the same time work the solidifiable polymeric mixtures into the interstices of the blankets for uniform distribution thereof to achieve a continuous matrix within the blankets. The resulting laminate 95 is immediately laid on the base surface, the leading end secured in place and the laminate conformed with the configuration thereof preferably before reaching the peak exotherm of the resin forming reaction taking place. In this state, the resin matrix is adhesive and tightly bonds the laminate to the base surface.

As the laminate 95 is being laid continuously on the base, second base section 21 automatically is advanced along the base surface at the same rate. This can be done by advancing the entire apparatus 11. More preferably, the apparatus 11 is moved periodically and at each stop a section of the laminate is laid on the surface by moving the second base section 21 along the boom section to maintain continuously the alignment of the base section with the base surface. When one laminate length is completed, the apparatus is moved back along the surface, stopped again and the laminate forming and applying sequence repeated. In this way, the second base section 21 and the laminate easily can be aligned more precisely.

The application of the laminate according to the above method can be completed quickly with a minimum of base preparation. Also, areas along the length of the laminate can be customized automatically to provide the particular surface characteristics required for a specific surface area. The laminate is permanently conformed to the base surface configuration and is firmly anchored thereto.

FIG. 5 illustrates an enlarged fragmentary cross-sectional view of the laminate 95 shown in FIG. 1. The laminate includes three spaced blankets 50, 51 and 52 with continuous resin matrices 96 therethrough. The resin is foamed in place and the laminate has a dense outer skin surface 97 with pores 98 increasing in size and number with increasing distance from the outer surface. Reinforcements 99 increase in size top to bottom.

Laminates of the present invention provide a novel combination of performance characteristics not previously attainable. This novel combination is achieved through the invention by simultaneously forming individual customized stratas of the laminate. Each strata includes a continuous porous blanket with a continuous polymeric matrix therein. The resin forming materials, fillers, reinforcements and other components are individually preselected to bestow particular unique properties to the strata.

The continuous structural laminate of the present invention includes a plurality of continuous generally parallel spaced integrally bonded porous blankets. Advantageously, at least two of the blankets differ in thickness and preferably the blankets increase in thickness from one to the next through the thickness of the laminate. At least two blankets advantageously differ in overall configuration and/or preferably basic ingredient configuration. The blankets also may differ in chemical composition. Advantageously, at least one of the blankets includes natural fibrous material and preferably consists essentially thereof.

A continuous polymeric matrix extends through each porous blanket of the laminate of the invention. The matrix may be achieved by direct application of a polymeric mixture to a blanket or by transfer of the polymeric mixture from an adjoining blanket. The polymeric matrices include compatible polymeric materials and at least two blankets include differing particulate reinforcements.

Advantageously, each polymeric mixture includes a polymer forming material, a gas foaming agent, a catalyst and a particulate reinforcement. The polymeric matrices preferably include substantially the same polymers.

The polymeric matrices advantageously include a major portion of a particulate reinforcement. Preferably, at least two of the polymeric matrices include substantially the same reinforcement in differing particle form. Advantageously, at least two of the reinforcements include natural mineral particles. The reinforcements preferably increase in particle size from one blanket to the next through the thickness of the laminate.

The polymer impregnated blankets are combined while the resins therein are still plastic to integrally form a laminate. In turn, the laminate while still plastic is applied to a base surface and tightly bonds thereto.

The laminates of the invention can replace multilayer operations such as the paving of roads which ordinarily are constructed by applying a base of coarse gravel, a layer of smaller gravel, followed by a base paving layer which is topped off with a finish paving. Since each layer is independent of the others, any breakdown or settling of one layer may cause damage to the other layers because each does not possess structural integrity by itself.

With a road laminate of the present invention, each strata has structural integrity of itself while including the same size gravel material. Also, the stratas are combined before the polymer has set so an integral structural laminate is formed in which the impregnated blankets adhere tightly to one another. Furthermore, the complete laminate is applied in one operation rather than successive operations over a period of time. This not only saves time but also eliminates the possibility of environmental conditions damaging the independent layers before the succeeding layers are applied thereover.

Not only are the individual stratas custom designed but also one or more of the individual stratas can be changed along their lengths as desired. In this way, a large surface area can be covered with a durable continuous laminate surface in which specific areas thereof provide appropriate surface characteristics for many different activities. Thus, a single surface can include a custom outer running track surface, with specially cushioned infield areas at the landing pits for high jumping, long jumping and pole vaulting. Also, a central area can provide a hard durable surface for dancing and/or stage activities.

The laminates of the invention are useful for playing fields for baseball, football, soccer, etc. A complete multistrata laminate which can be applied in a single operation may be designed to provide water drainage, cushioning, a pleasing surface appearance, outstanding durability and freedom from strats separation and/or settling. In such applications of the laminate of the invention, changes from hard to resilient reinforcement particles may achieve the desired differences in cushioning.

The above description and the accompanying drawings show that the present invention provides a novel mobile structural laminate forming and applying apparatus, method and product with features and advantages not known previously. The base surface requires a minimum of preparation before the laminate is applied. The laminate can be placed at depressed temperatures. The laminate is formed and applied with a minimum of supervision and labor.

The configuration and composition of the laminate can be changed along its length automatically to meet the requirements for particular areas. The laminate is set in the configuration of the base and anchored thereto.

The apparatus and method permit a large variety of laminates to be produced. Changes from one laminate structure to another can be made easily and quickly.

It will be apparent that various modifications can be made in the particular structural laminate forming and applying apparatus, method and product described in detail above and shown in the drawings within the scope of the present invention. The size, configuration and arrangement of components, steps and materials can be changed to meet specific requirements. For example, the number of components and reservoirs can be different. Also, the apparatus may include different drive, actuating and other components and mechanisms. These and other changes can be made in the apparatus, method and product provided the funcioning and operation thereof are not adversely affected. Therefore, the scope of the present invention is to be limited only by the following claims.

What is claimed is:

1. A method of continuously forming a continuous structural laminate and applying said laminate to a surface including the steps of dispensing continuously a first solidifiable liquid polymeric mixture uniformly to a continuously advancing first porous blanket, dispensing continuously a second solidifiable liquid polymeric mixture uniformly to a continuously advancing second porous blanket, dispensing continuously an individually pre-selected solidifiable liquid polymeric mixture to each remaining continuously moving porous blanket, combining said advancing porous blankets into a single laminate with each blanket closely adjacent to adjoining blankets, monitoring the rate of advance of each blanket, coordinating said rate of advance with the flow rate of the liquid polymeric mixture thereon, monitoring the relationship of the blankets to one another in the combined laminate, immediately applying the freshly formed laminate to a surface continuously while said laminate is deformable and adhesive, simultaneously conforming said laminate to said surface configuration and setting said laminate in the configuration thereof.

2. A continuous structural laminate formed according to the method of claim 1 wherein at least two of said porous blankets differ in thickness.

3. A continuous structural laminate formed according to the method of claim 1 wherein at least two of said porous blankets differ in construction.

4. A continuous structural laminate formed according to the method of claim 1 wherein at least two of said porous blankets differ in chemical composition.

5. A continuous structural laminate formed according to the method of claim 1 wherein said blankets increase in thickness from one to the next through the thickness of said laminate.

6. A continuous structural laminate formed according to the method of claim 1 wherein at least one of said blankets includes natural fibrous material.

7. A continuous structural laminate formed according to the method of claim 1 wherein at least one of said blankets consists essentially of natural fibrous material.

8. A continuous structural laminate formed according to the method of claim 1 wherein said polymeric matrices include substantially the same polymers.

9. A continuous structural laminate formed according to the method of claim 1 wherein at least two of said polymeric matrices include different particulate reinforcements.

10. A continuous structural laminate formed according to the method of claim 1 wherein at least one of said particulate reinforcements includes natural mineral particles.

11. A continuous structural laminate formed according to the method of claim 1 wherein said particulate reinforcements increase in particle size from one blanket to the next through the thickness of said laminate.

12. A method of continuously forming and applying a continuous structural laminate according to claim 1 wherein at least one of said porous blankets is formed of interconnected discontinuous fibers.

13. A method of continuously forming and applying a continuous structural laminate according to claim 12 wherein said porous blanket is a straw blanket rolled into a cylindrical bale.

14. A method of continuously forming and applying a continuous structural laminate according to claim 1 wherein said solidifiable liquid polymeric mixture is a thermosetting resin forming mixture.

15. A method of continuously forming and applying a continuous structural laminate according to claim 1 wherein the flow rates of components delivered to a mixing portion are individually monitored.

16. A method of continuously forming and applying a continuous structural laminate according to claim 15 wherein said components are mixed by moving them through said mixing chamber along a tortuous path.

17. A method of continuously forming and applying a continuous structural laminate according to claim 1 wherein said laminate is applied to said surface and conformed thereto before the mixture therein reaches its peak exothermic reaction.

18. A method of continuously forming and applying a continuous structural laminate according to claim 1 including the step of combining said impregnated blankets with spaced longitudinal strength members.

19. A continuous structural laminate set in a preselected configuration formed according to the method of claim 1.

* * * * *